United States Patent [19]

Fujiyama et al.

[11] Patent Number: 4,668,568

[45] Date of Patent: May 26, 1987

[54] MAGNETIC RECORDING MEDIUM

[75] Inventors: Masaaki Fujiyama; Nobuo Tsuji; Nobutaka Yamaguichi, all of Kanagawa, Japan

[73] Assignee: Fuji Photo Film Co., Ltd., Kanagawa, Japan

[21] Appl. No.: 878,405

[22] Filed: Jun. 20, 1986

Related U.S. Application Data

[63] Continuation of Ser. No. 786,178, Oct. 10, 1985, abandoned, which is a continuation-in-part of Ser. No. 578,613, Feb. 13, 1984, abandoned, which is a continuation of Ser. No. 375,689, May 6, 1982, abandoned.

[30] Foreign Application Priority Data

May 7, 1981 [JP] Japan .................................. 56-67643

[51] Int. Cl.$^4$ ............................................. G11B 5/708
[52] U.S. Cl. .................................. 428/323; 252/62.54; 427/128; 428/329; 428/331; 428/425.9; 428/532; 428/694; 428/900
[58] Field of Search ............... 428/694, 695, 328, 329, 428/323, 331, 900, 532, 425.9; 427/131, 128; 252/62.54; 360/134–136

[56] References Cited

U.S. PATENT DOCUMENTS

| | | | |
|---|---|---|---|
| 4,015,042 | 3/1977 | Chassuigne | 428/328 |
| 4,115,290 | 9/1978 | Kubota et al. | 252/62.54 |
| 4,275,115 | 8/1981 | Naruse | 428/329 |
| 4,337,288 | 6/1982 | Takenaka | 428/694 |
| 4,399,189 | 8/1983 | Nakashima | 428/694 |
| 4,420,408 | 12/1983 | Kojimoto | 428/329 |
| 4,420,532 | 12/1983 | Yamaguchi | 428/694 |
| 4,423,452 | 12/1983 | Kajimoto | 428/694 |
| 4,425,400 | 1/1984 | Yamaguchi | 428/694 |
| 4,571,362 | 2/1986 | Sato | 428/329 |
| 4,595,631 | 6/1986 | Matsumoto | 428/329 |
| 4,618,536 | 10/1986 | Morioka | 428/694 |

Primary Examiner—Ellis P. Robinson
Attorney, Agent, or Firm—Armstrong, Nikaido, Marmelstein & Kubovcik

[57] ABSTRACT

This invention provide a magnetic recording medium with well-balanced excellent properties as to video head abrasion, still life, video S/N and drop out, which comprises a non-magnetic support and a magnetic recording layer containing a ferromagnetic powder, a binder and (A) at least one inorganic compound powder selected from the group consisting of $Cr_2O_3$, SiC and mixtures thereof and (B) at least one inorganic compound powder selected from the group consisting of $Al_2O_3$, $TiO_2$, $SiO_2$, ZnO and mixtures thereof.

2 Claims, 1 Drawing Figure

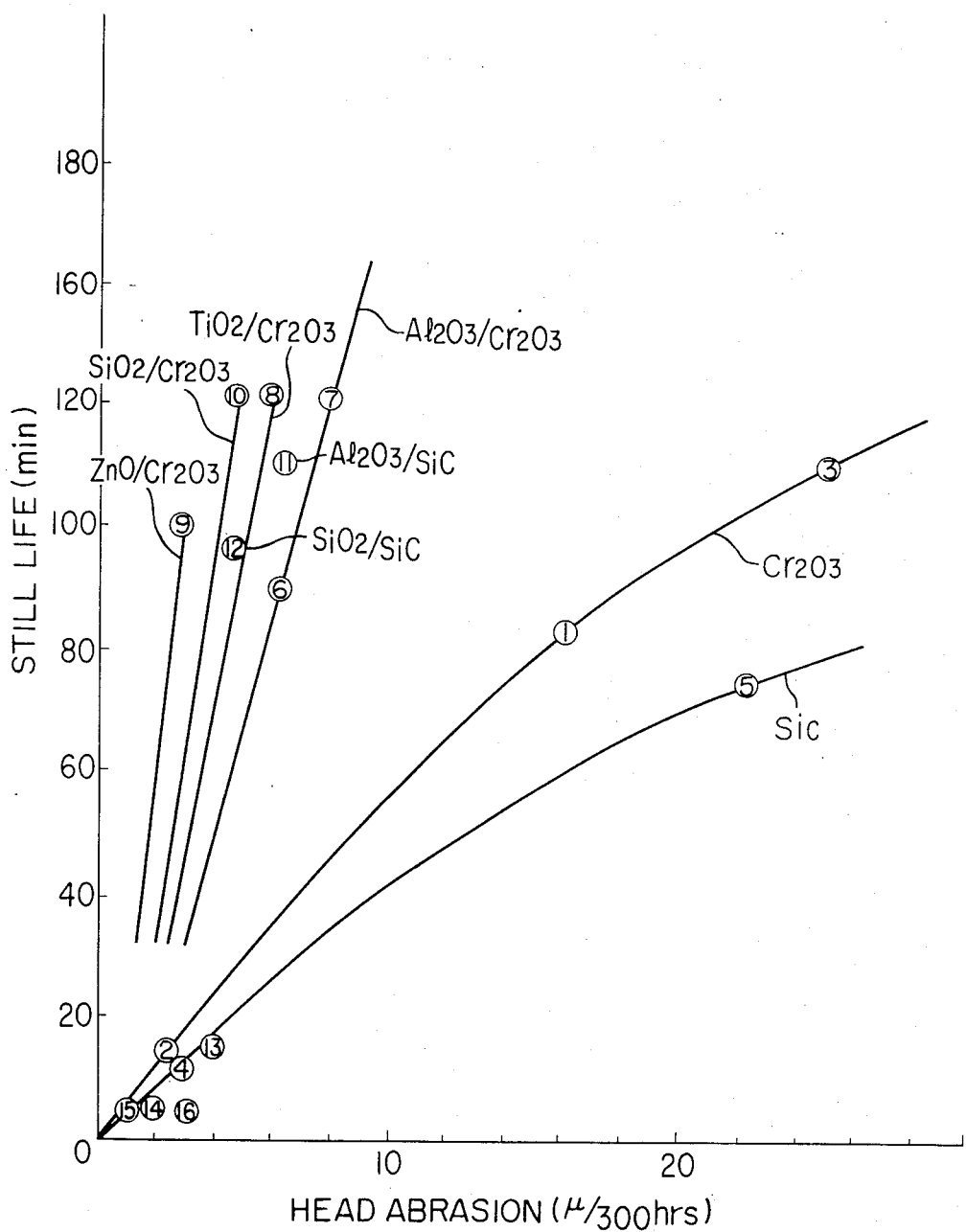

MAGNETIC RECORDING MEDIUM

This application is a continuation of application Ser. No. 786,178 filed Oct. 10, 1985, which is a continuation of application Ser. No. 578,613 filed Feb. 13, 1984, and which, in turn, is a continuation of application Ser. No. 375,689 filed May 6, 1982; each of the prior applications being abandoned.

BACKGROUND OF THE INVENTION

1. Field of the Invention

This invention relates to a magnetic recording medium and more particularly, it is concerned with a magnetic recording medium having well-balanced excellent properties as to video head abrasion, still life, video S/N, drop out, etc.

2. Description of the Prior Art

In a magnetic recording medium comprising a non-magnetic support and a magnetic recording layer coated thereon consisting of a ferromagnetic powder and a binder, for example, video tapes, audio tapes, memory tapes, etc., it has eagerly been desired lately to improve the properties thereof and in the case of small-sized video tape recorders, in particular, severer conditions are required. Even if the pointed end width of a video head becomes 10 microns in future, a tape is contacted with the video head at a relative speed of 3 to 7 m/sec (about 20 km/hr) and in that case, it is also required to hold the abrasion of the video head in 10 $\mu$/300 hrs or less and the still frame life in 90 minutes or longer. 100 hours of head abrasion extends to a whole length of 2000 km and the still life is also regarded as expired when the surface of a video head is contaminated in a thickness of 0.1 micron or more.

Up to the present time, various magnetic compositions have been proposed such as using an abrasive agent having an Mohs' hardness of at least 6 and monobasic fatty acid described in Japanese Patent Publication No. 39402/1974 and containing a non-magnetic powder having a Mohs' hardness of at least 9 and granular $\alpha$-$F_2O_3$ powder described in Japanese Patent Application (OPI) No. 129955/1980. However, these compositions cannot satisfy all the properties such as still life, head abrasion, drop out, video S/N, etc.

SUMMARY OF THE INVENTION

It is an object of the present invention to provide a magnetic recording medium whereby the above described drawbacks of the prior art can be overcome.

It is another object of the present invention to provide a magnetic recording medium capable of satisfying the properties regarding video head abrasion, still life, video S/N, drop out and the like.

It is a further object of the present invention to provide a magnetic recording tape with a lengthened still life without increasing a head abrasion by the use of two kinds of inorganic powders.

These objects can be attained by a magnetic recording medium comprising a non-magnetic support and a magnetic recording layer containing a ferromagnetic powder, binder and (A) at least one inorganic powder selected from the group consisting of $Cr_2O_3$, SiC and mixtures thereof and (B) at least one inorganic powder selected from the group consisting of $Al_2O_3$, $TiO_2$, $SiO_2$, ZnO and mixtures thereof.

BRIEF DESCRIPTION OF THE DRAWING

The accompanying drawing illustrating the principle and merits of the present invention is a graph showing the relationship between the head abrasion and still life as to various inorganic powders.

DETAILED DESCRIPTION OF THE INVENTION

In accordance with the present invention, there is provided a magnetic recording medium having a descreased video head abrasion, lengthened still life, improved video S/N and suppressed increase of drop out during repeated use even if the shape of a video head is small-sized in future. Thus, such an improvement can be achieved that is impossible by the amount of an abrasive agent used in the prior art.

Addition of abrasives and other inorganic powders, which are well known in the art, produces the following phenomena depending upon the variety thereof:

(1) The still life is increased in proportion to the amount of a powder, but on the other hand, the head abrasion is also increassed.

(2) The head abrasion is increased in proportion to the amount of a powder and the deterioration of the still life or video S/N is only improved to a slight extent.

(3) Even if the amount of a powder is increased, the deterioration of the still life or video S/N is only improved to a slight extent and the head abrasion is not so changed.

On the contrary, the inventors have found that the still life can be lengtheded without increasing largely the head abrasion, deterioration of the video S/N can be decreased and increase of the drop out can be suppressed by using jointly two kinds of inorganic powders and have reached the present invention.

Accordingly, the feature of the present invention consists in a magnetic recording medium comprising a non-magnetic support and a magnetic recording layer containing a ferromagnetic powder, a binder and (A) at least one inorganic powder selected from the group consisting of $Cr_2O_3$, SiC and mixtures thereof and (B) at least one inorganic powder selected from the group consisting of $Al_2O_3$, $TiO_2$, $SiO_2$, ZnO and mixtures thereof.

One of the inorganic powders used in the present invention is selected from the group consisting of $Cr_2O_3$, SiC and mixtures thereof and their Mohs' hardness is relatively high, i.e. 8.5 to 9.5. This inorganic powder has a particle size of preferably 0.2 to 5 microns, more preferably 0.2 to 1.5 microns, most preferably 0.3 to 1 micron and is added in a proportion of preferably 0.5% by weight or less, more preferably 0.05 to 0.5% by weight, most preferably 0.1 to 0.4% by weight to the magnetic powder.

The other of the inorganic powders used in the present invention is selected from the group consisting of $Al_2O_3$, $TiO_2$, ZnO, $SiO_2$ and mixtures thereof, which have a Mohs' hardness of at most that of the above described first inorganic powder, i.e. 9, 6–6.5, 7 and 4–5 respectively. This inorganic powder has a particle size of preferably 0.01 to 1 micron, more preferably 0.05 to 0.5 micron, in particular, at most that of the above described first inorganic powder and is added in a proportion of preferably 3% by weight or more, more preferably 3 to 20% by weight, most preferably 5 to 15% by weight to the magnetic powder, in particular, at least ten times as much as that of the first inorganic powder.

In the present invention, the merits or effects are particularly remarkable when using a binder consisting of three components of a nitrocellulose resin, polyurethane resin and hardener such as an isocyanate. The smaller the particle size of a magnetic powder (at most 0.4 micron), the higher the coercive force (at least 550 Oe) and the better the surface smoothness of a magnetic layer. The shorter the recording wavelength (at most 2 microns), the better the results.

The magnetic recording medium of the present invention produces the following merits:

(1) The abrasion quantity of a video head can remarkably be reduced.

(2) The still life can be lengthened to a great extent.

(3) The deterioration of the video S/N can be held little even after repeated use.

(4) The drop out is not so increased even after repeated use.

(5) The initial video S/N is higher.

Preparation of the magnetic recording medium of the present invention can be carried out in conventional manner by coating a non-magnetic support member with a coating composition comprising a magnetic powder, the above described two inorganic powders and binder blended and kneaded with an organic solvent to which additives can optionally be added such as lubricants, dispersing agents, antistatic agents and the like.

As the magnetic powder, there are used ferromagnetic fine powders of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$($FeO_x$: $1.33 < x < 1.50$), Co-doped Berthollide compounds of $\gamma$-$Fe_2O_3$ and $Fe_3O_4$($FeO_x$: $1.33 < x < 1.50$), $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

As the binder, a combination of a nitrocellulose resin, polyurethane resin and hardener as described above is preferably used, but other ordinary binders can also be used.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermosplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15026/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, epoxy-polyamide resins, mixtures of high molecular weight polyester resins and isocyanate prepolymers, mixtures of methacrylic acid salt copolymer and diisocyanate prepolymers, mixtures of polyesterpolyols and polyisocyanates, ure-formaldehyde resins, mixtures of low molecular weight glycols, high molecular weight diols and triphenylmethane triisocyanates, polyamide resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972 and 28922/1972, U.S. Pat. Nos. 3,144,353, 3,320,090, 3,437,510, 3,597,273, 3,781,210 and 3,781,211, etc. These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of ferromagnetic powder.

In addition to the above described binder and ferromagnetic fine powder, other additives such as dispersing agents, lubricants, abrasives antistatic agents and the like can be added to the magnetic recording layer.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid esters produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication No. 23889/1968, Japanese Patent Application Nos. 28647/1967 and 81543/1968, U.S. Pat. Nos. 3,470,021, 2,492,235, 3,497,411, 3,523,086, 3,625,760, 3,630,772, 3,634,253, 3,642,539 and 3,687,725, IBM Technical Disclosure Bulletin, Vol. 9, No. 7, page 779 (December 1966), and ELECTRONIK, No. 12, page 380 (1961), West Germany.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic compounds, e.g. higher alkylamines, quaternary ammonium salts, pyridine and the like; phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to so no Oyo (Synthesis of Surface Active Agents and Their Applications), Maki Shoten, Tokyo (1964), A. M. Schwrats et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran (Handbook of Surface Active Agents)", 6th Ed., Sangyo Tosho Co., Tokyo (Dec. 20, 1966), etc.

These surface active agents can be used individually or in combination with each other. These surface active agents are generally used as antistatic agnets, but in some cases, they are used for other purposes, for examples, for improving dispersibility, magnetic properties and lubricity, or as an auxiliary coating agent.

Formation of a magnetic recording layer is carried out by dissolving or dispersing the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc., and non-magnetic metals, for example, copper, aluminum, zinc, etc. Such a non-magnetic support can have a thickness of about 3 to 100 microns, preferably 5 to 50 microns in the form of a film or sheet, and about 0.5 to 10 mm in the form of disk or card. A cylindrical form such as drum can be used.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spary coating and the like, and other coating methods can also be used. These methods are described in "Coating Kogaku (Coating Engineering)", page 253 to 277, published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ehters and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrchloride, chloroform, ethylene chlorohydrin, dichlorobenzene and the like; etc.

The coating thickness is ordinarily 0.5 to 10 microns, preferably 0.8 to 6 microns on dry base.

The present invention will be explained in detail with reference to the following examples. It will be obvious to those skill in the art that various changes and modifications can be made in the components, ratios, operational order and the like without departing from the spirit of the present invention. Therefore, the present invention should not be construed as being limited to the following examples. All parts, percents, ratios and the like are by weight unless otherwise indicated.

EXAMPLES

| Basic Composition | Parts by weight |
| --- | --- |
| Ferromagnetic Powder | 100 |
| Carbon Black | 5 |
| Nitrocellulose | 8 |
| Fatty Acid (Oleic Acid) | 0.7 |
| Polyurethane Resin | 6 |
| Fatty Acid Ester | 0.8 |
| Polyisocyanate | 8 |
| Inorganic Powder selected from $Cr_2O_3$ and SiC | Variable |
| Inorganic Powder selected from $Al_2O_3$, $TiO_2$, $SiO_2$ and ZnO | Variable |

Using a Co-containing ferromagnetic iron oxide with a coercive force of 650 Oe and the above described basic composition, a coating liquid was prepared in a ball mill, coated onto a polyethylene terephthalate having a thickness of 14μ to give a coating thickness of 6μ on dry base, dried, subjected to a supercalendering treatment and then slit in a width of 12.65 mm, thus obtaining a video tape with a nominal width of ½ inch.

The thus resulting video tapes were loaded in a video cassette recorder (VTR) to assess various properties:

(I) Initial Video S/N

Video S/N of the first recording and reproducing signal was measured.

(II) Video Head Abrasion

The difference of heights of a video head was measured before and after running a same video tape for 300 hours.

(III) Still Life

The period of time was measured until an image disappeared when a VTR was set in "Still State".

(IV) Increase of Drop Outs

The difference of numbers of drop outs per minutes was measured as to a same video tape at the first time and after using 50 times.

(V) Deterioration of Video S/N

A video signal was recorded and the difference of the initial video S/N and that after reproducing 50 times was measured.

These assessement results are tabulated below and the relationship between the head abrasion (μ/300 hours) and still life (min) is plotted as to the each sample to obtain graphs as shown in the accompanying drawing, in which the plotted numbers ①–⑯ correspond to Sample Nos. 1-16.

As is evident from this table and the graphs, the samples of the present invention are superior to the comparative samples as follows:

(1) Initial video S/N (I) is higher.

(2) Video S/N at the time of reproducing 50 times (VI) is improved from the initial value (I). This effect is caused by the joint use of the two inorganic powders and it is very desirable that the video S/N is shifted to the plus side by the repeated use.

(3) Not only still life (III) is very long, but also video head abrasion (II) is less.

(4) Increase of drop outs (IV) after repeated use is fewer. Comparative Examples wherein either of the inorganic powders of the present invention is not used are inferior to Examples of the present in the following points:

(1) The head abrasion is increased with lengthening of the still life. That is, it is difficult to realize simultaneously a longer still life and lower head abrasion.

(2) Initial video S/N (I) is smaller than that of the present invention.

(3) In Comparative Examples, the video S/N deteriorates, resulting in a large difference after repeated use from that of the present invention.

(4) In Comparative Examples, the increase of drop outs after repeated use is larger.

What is claimed is:

1. A magnetic recording medium comprising a nonmagnetic support and a magnetic recording layer containing a ferromagnetic powder, a binder and (A) 0.1 to 0.4% by weight based on the weight of the ferromagnetic powder of at least one inorganic powder selected from the group consisting of $Cr_2O_3$, SiC and mixtures

| Sample No. | Inorganic Powder A | Inorganic Powder B | (I) (dB) | (VI) (dB) | (V) (dB) | (II) (μ/300 hr) | (III) (min) | (IV) (/min) |
|---|---|---|---|---|---|---|---|---|
| 1 | $Cr_2O_3$, $\bar{x} = 0.45\mu$ 5 parts | — | 0 | −2.0 | −2.0 | 16 | 83 | 15 |
| 2 | $Cr_2O_3$, $\bar{x} = 0.45\mu$ 5 part | | −0.5 | −2.9 | −2.4 | 2.5 | 15 | 21 |
| 3 | $Cr_2O_3$, $\bar{x} = 0.45\mu$ 8 parts | | −0.3 | −1.8 | −1.5 | 25 | 110 | 11 |
| 4 | SiC, $\bar{x} = 0.4\mu$ 0.5 parts | | −0.5 | −3.5 | −3.0 | 2.5 | 12 | 28 |
| 5 | SiO, $\bar{x} = 0.4\mu$ 8 parts | | −0.3 | −3.2 | −2.9 | 22 | 75 | 26 |
| 6 | $Cr_2O_3$, $\bar{x} = 0.45\mu$ 0.4 part | $Al_2O_3$, $\bar{x} = 0.25\mu$ 5 parts | +0.5 | +1.2 | +0.7 | 6 | 90 | 3 |
| 7 | $Cr_2O_3$, $\bar{x} = 0.45\mu$ 0.4 part | $Al_2O_3$, $\bar{x} = 0.25\mu$ 10 parts | +0.7 | +1.5 | +0.8 | 8.5 | 120< | 0 |
| 8 | $Cr_2O_3$, $\bar{x} = 0.45\mu$ 0.4 part | $TiO_2$, $\bar{x} = 0.15\mu$ 15 parts | +0.8 | +1.7 | +0.9 | 6 | 120< | 1 |
| 9 | $Cr_2O_3$, $\bar{x} = 0.45\mu$ 0.4 part | ZnO, $\bar{x} = 0.12\mu$ 18 parts | +0.3 | +1.2 | +0.9 | 3 | 100 | 5 |
| 10 | $Cr_2O_3$, $\bar{x} = 0.45\mu$ 0.4 part | $SiO_2$, $\bar{x} = 0.13\mu$ 15 parts | +0.4 | +1.1 | +0.7 | 5 | 120< | 2 |
| 11 | SiC, $\bar{x} = 0.4\mu$ 0.3 part | $Al_2O_3$, $\bar{x} = 0.25\mu$ 5 parts | +0.1 | +0.9 | +0.8 | 6 | 110 | 6 |
| 12 | SiC, $\bar{x} = 0.35\mu$ 0.3 parts | $SiO_2$, $\bar{x} = 0.09\mu$ | 0 | +0.3 | +0.3 | 4.5 | 95 | 7 |
| 13 | — | $Al_2O_3$, $\bar{x} = 0.25\mu$ 5 parts | −0.4 | −3.7 | −3.3 | 4 | 15 | 35 |
| 14 | — | $TiO_2$, $\bar{x} = 0.15\mu$ 15 parts | −0.9 | −4.9 | −4.0 | 2 | 5> | 93 |
| 15 | — | ZnO, $\bar{x} = 0.12\mu$ 18 parts | −1.2 | −5.8 | −4.6 | 1 | 5> | 100< |
| 16 | — | $SiO_2$, $\bar{x} = 0.13\mu$ | −0.7 | −4.5 | −3.8 | 3 | 5> | 85 |

Note:
Sample Nos. 1-5 and 13-16 = Comparative Examples
Sample Nos. 6-12 = Examples of Our Invention
(VI) = Video S/N after reproducing 50 times (dB)
$\bar{x}$ = Mean Particle Size (μ)

thereof and (B) at least 3.0% by weight based on the weight of the ferromagnetic powder of at least one inorganic powder selected from the group consisting of $Al_2O_3$, $TiO_2$, $SiO_2$, and $ZnO$ and mixtures thereof; the inorganic powder (A) having a particle size of 0.2 to 5 microns and a Mohs' hardness of 8.5 to 9.5, the inorganic powder (B) having a particle size of at most 1 micron and smaller than that of the inorganic powder (A) and a Mohs' hardness smaller than that of the inorganic powder (A), and the binder consisting of a nitrocellulose resin, a urethane resin and a polyisocyanate.

2. The magnetic recording medium of claim 1, wherein the quantity of the inorganic powder (B) is at least 10 times as much as that of the inorganic powder (A).

* * * * *

UNITED STATES PATENT AND TRADEMARK OFFICE
CERTIFICATE OF CORRECTION

PATENT NO. : 4,668,568

DATED : May 26, 1987

INVENTOR(S) : MASAAKI FUJIYAMA ET AL

It is certified that error appears in the above-identified patent and that said Letters Patent is hereby corrected as shown below:

On the cover page, Item [75], change "Yamaguichi" to --- Yamaguchi ---.

Signed and Sealed this

Fifteenth Day of December, 1987

Attest:

DONALD J. QUIGG

Attesting Officer     Commissioner of Patents and Trademarks